(12) United States Patent  
Rousseau et al.

(10) Patent No.: US 7,690,198 B2
(45) Date of Patent: Apr. 6, 2010

(54) INTEGRATED HYSTAT HAVING SINGLE INPUT AND INDEPENDENT OUTPUT

(75) Inventors: Paul Alan Rousseau, Raleigh, NC (US); Justin Douglas Speichinger, Holly Springs, NC (US)

(73) Assignee: Caterpillar S.A.R.L., Geneva (CH)

( * ) Notice: Subject to any disclaimer, the term of this patent is extended or adjusted under 35 U.S.C. 154(b) by 214 days.

(21) Appl. No.: 11/790,309

(22) Filed: Apr. 25, 2007

(65) Prior Publication Data

US 2008/0264054 A1   Oct. 30, 2008

(51) Int. Cl.
*F16D 31/02* (2006.01)

(52) U.S. Cl. ............................. 60/488; 60/454; 60/487

(58) Field of Classification Search ................. 60/454, 60/464, 484, 486, 487, 488
See application file for complete search history.

(56) References Cited

U.S. PATENT DOCUMENTS

| | | | |
|---|---|---|---|
| 3,279,172 A | 10/1966 | Kudo et al. | |
| 4,836,693 A * | 6/1989 | Stroze | 384/121 |
| 5,555,727 A | 9/1996 | Hauser et al. | |
| 5,918,691 A | 7/1999 | Ishii | |
| 5,957,229 A | 9/1999 | Ishii | |
| 6,487,856 B1 * | 12/2002 | Ohashi et al. | 60/484 |
| 6,719,080 B1 | 4/2004 | Gray, Jr. | |
| 6,775,976 B1 | 8/2004 | Phanco et al. | |
| 6,874,320 B2 | 4/2005 | Sakikawa | |
| 6,971,234 B1 | 12/2005 | Phanco et al. | |
| 7,047,736 B1 | 5/2006 | Langenfeld et al. | |
| 7,083,014 B2 | 8/2006 | Forster | |
| 7,121,092 B1 | 10/2006 | Phanco et al. | |
| 2005/0166589 A1 | 8/2005 | Sakikawa | |

FOREIGN PATENT DOCUMENTS

| | | |
|---|---|---|
| JP | 06183274 A | 7/1994 |
| JP | 06211059 A | 8/1994 |
| JP | 07323739 A | 12/1995 |

* cited by examiner

*Primary Examiner*—Michael Leslie
(74) *Attorney, Agent, or Firm*—Finnegan, Henderson, Farabow, Garrett & Dunner

(57) ABSTRACT

A drivetrain for use in a mobile vehicle is disclosed. The drivetrain may have a housing, a first hydraulic pump connected to the housing, and a second hydraulic pump connected to the housing. The second hydraulic pump may be in axial alignment with the first hydraulic pump. The drivetrain may also have a first motor fluidly connected to the first hydraulic pump, and a second motor fluidly connected to the second hydraulic pump. The first and second motors may have an axial direction substantially perpendicular to the axial alignment of the first and second hydraulic pumps.

20 Claims, 4 Drawing Sheets

US 7,690,198 B2

INTEGRATED HYSTAT HAVING SINGLE INPUT AND INDEPENDENT OUTPUT

TECHNICAL FIELD

The present disclosure relates generally to a hydrostatic transmission and, more particularly, to an integrated hydrostatic transmission configuration having a single input and multiple independent outputs.

BACKGROUND

Machines, including skid steer loaders, track-type tractors, hydraulic tracked excavators, military tanks, and other similar types of heavy construction and mining equipment, are used for a variety of tasks. These machines typically include ratio control devices that transmit torque from an engine to one or more traction devices that move the machine. These ratio control devices generally include a hydrostatic transmission having a common pump and two motors independently driven by pressurized fluid from the pump, or two completely separate pump and motor combinations.

Two independent motors are required for steering of the machine. That is, during a steering event, one or more driven traction devices located on one side of the machine may be caused to rotate at a slower speed than or in a direction opposite to one or more driven traction devices located on an opposing side of the machine to cause the machine to turn. Without independent driving rotations of the traction devices, these types of machine would not be steerable.

Having one pump per motor lowers the cost of the machine and improves machine efficiency and responsiveness. Specifically, when both motors are driven by the same pump, that pump must be sized to supply two times the maximum flow rate of pressurized fluid that any one motor could possibly demand. In this manner, it would be ensured that the machine would respond as the operator desires under all operating conditions. Although this strategy can be effectively implemented to drive and steer such a machine, the large size of the pump required to supply the maximum capacity of two pumps increases the cost of the hydrostatic transmission. And, larger pumps, because of the momentum thereof, typically have lower efficiencies and less responsiveness. Thus, one pump per motor may be a preferred configuration.

Although a preferred configuration, packaging two pumps, two motors, and their associated drive couplings and hydraulic circuitry in the undercarriage of a machine can be difficult and bulky. One transmission design focused on reducing these negative aspects is described in U.S. Patent Publication No. 2005/0166589 (the '589 publication) by Sakikawa published on Aug. 4, 2005. The '589 publication describes an axle driving apparatus for a walk-behind snow blower machine. This axle driving apparatus has a common input shaft for receiving power from a prime mover by way of a belt and pulley arrangement, and two axially aligned drive axles. The common input shaft extends perpendicular to the axles of the snow blower, and drives a pair of stepless transmissions through a gear train. Each of the stepless transmissions are hydrostatic-type transmissions disposed within a common housing that includes mutually fluidly connected pumps and motors. The hydraulic motors are drivingly and independently connected to their respective axles through associated gear trains.

The pumps and motors of the '589 publication are arranged to conserve space. Specifically, the two pumps are symmetrically offset from the common input shaft and oriented in the same direction as the common input shaft. Similarly, the two motors are offset from the two drive axles and aligned in the same direction as the drive axles. This symmetric and perpendicular pump, motor, and shaft arrangement may function to both reduce the size of the axle driving apparatus and common housing in a direction perpendicular to the drive axles, while restraining its expansion in the axial direction.

Although the axle driving apparatus described in the '589 publication may be compact and simple, it may still lack efficiency and applicability. Specifically, because the common inlet connects to the pumps, and the motors connect to their respective drive axles by way of gear trains, some rotational losses may be unnecessarily incurred. These gear trains may also consume valuable space with the common housing. And, because the entire apparatus is connected to the prime mover by way of only a belt and pulley arrangement, the maximum amount of torque transmittable through the apparatus may be less than required to drive a skid steer loader, a track type tractor, a hydraulic excavator, a military vehicle, and other heavy equipment.

The disclosed transmission configuration is directed to overcoming one or more of the problems set forth above.

SUMMARY OF THE INVENTION

In one aspect, the present disclosure is directed to a drivetrain. The drivetrain may include a housing, a first hydraulic pump connected to the housing, and a second hydraulic pump connected to the housing. The second hydraulic pump may be in axial alignment with the first hydraulic pump. The drivetrain may also include a first motor fluidly connected to the first hydraulic pump, and a second motor fluidly connected to the second hydraulic pump. The first and second motors may have an axial direction substantially perpendicular to the axial alignment of the first and second hydraulic pumps.

In another aspect, the present disclosure is directed to another drivetrain. This drivetrain may include a housing, and a single integral shaft extending through two opposing sides of the housing. The drivetrain may also include a first hydraulic pump connected to the housing and directly driven by the single integral shaft, and a second hydraulic pump connected to the housing and directly driven by the single integral shaft. The drivetrain may also include a first motor connected to the housing and driven by the first hydraulic pump, and a second motor connected to the housing and driven by the second hydraulic pump.

DETAILED DESCRIPTION

Figure 1:
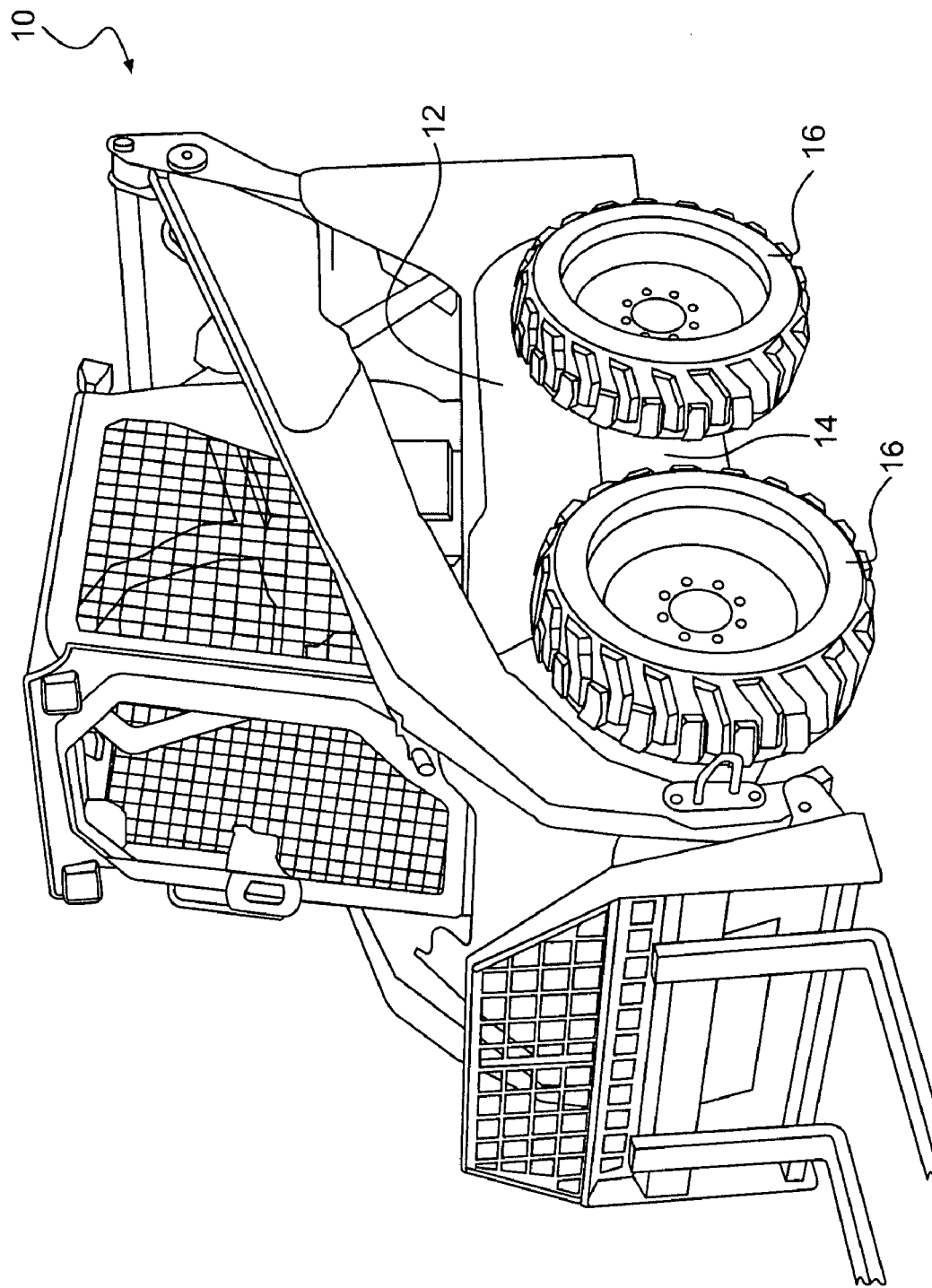
FIG. 1 is a pictorial illustration of an exemplary disclosed machine.

FIG. 1 illustrates an exemplary disclosed machine 10 having a plurality of components that cooperate to perform some type of task associated with an industry such as mining, construction, agriculture, transportation, or any other industry. While machine 10 is illustrated as a skid steer loader, machine 10 may embody any type of mobile machine having one or more systems operable to perform a particular function. For example, machine 10 may include an on-highway vehicle, an off-highway vehicle, a wheel loader, an excavator, a military tank, or any other type of machine. Machine 10 may include, among other things, a power source 12, one or more traction devices 16, and a transmission 14.

Power source 12 may produce a mechanical power output and embody an internal combustion engine such as, for example, a diesel engine, a gasoline engine, a gaseous fuel-powered engine, or any other type of engine apparent to one skilled in the art. Power source 12 may, alternatively, embody a non-combustion source of power such as a battery, a fuel cell, a motor, or any other suitable source of power.

Traction devices 16 may include wheels located on either side of machine 10 and driven by power source 12 to affect the propulsion and yaw of machine 10. Traction devices 16 may include one or more driven components, e.g., an axle or a sprocket; one or more non-driven components, e.g., a guide wheel or a hub; and/or additional components known in the art. The driven components may be operatively connected to power source 12 via transmission 14 to receive mechanical power therefrom and provide movement to traction devices 16, thereby propelling machine 10. It is contemplated that traction devices 16 may additionally or alternatively include tracks, belts, or other traction devices in any appropriate number.

Figure 2:
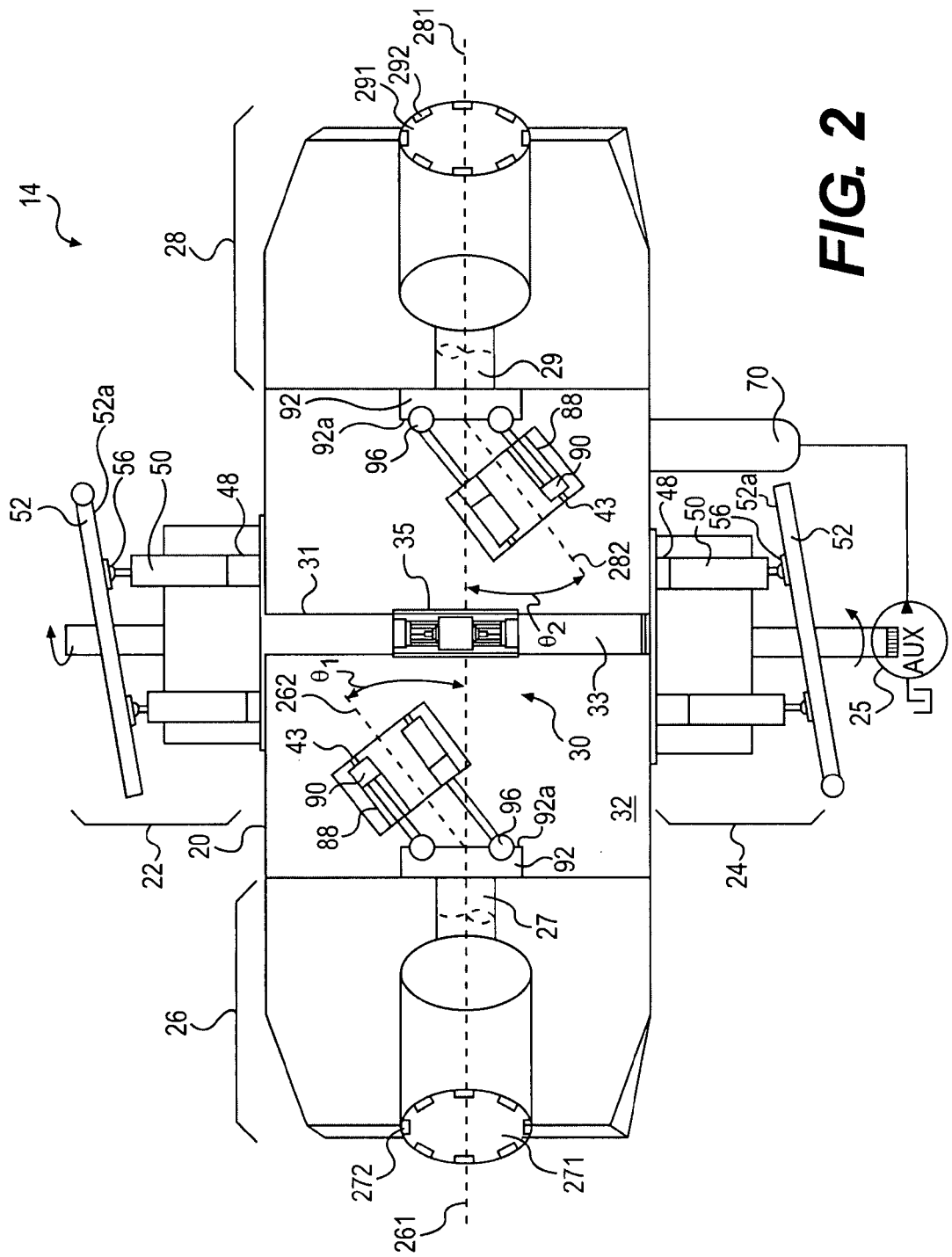
FIG. 2 is a diagrammatic and schematic illustration of an exemplary disclosed transmission for use with the machine of FIG. 1.

As illustrated in FIG. 2, transmission 14 may include components that cooperate to efficiently transmit energy from power source 12 to traction devices 16. Transmission 14 may include a first hydraulic pump 22, a second hydraulic pump 24 arranged in axial alignment with the first hydraulic pump 22, and a driveshaft assembly 30 extending completely through at least one of the first and second hydraulic pumps 22, 24 to receive a torque input. Transmission 14 may further include a first motor 26 fluidly connected to the first hydraulic pump 22, and a second motor 28 fluidly connected to the second hydraulic pump 24. Both first and second motors 26, 28 may have an axial direction substantially perpendicular to the axial alignment of the first and second pumps 22, 24. Further, first motor 26 and second motor 28 may, themselves, be axially aligned.

First hydraulic pump 22 may be a swashplate-type pump and include multiple piston bores 48 and pistons 50 held against a tiltable and rotatable swashplate 52. One piston 50 may be slidably disposed within each of the bores 48. The swashplate 52 may have a driving surface 52a, and each piston 50 may be biased into engagement with the driving surface 52a. A joint 56, such as, for example, a ball and socket joint, may be disposed between each piston and swashplate 52 to allow for relative movement between the swashplate 52 and each piston 50. The pistons 50 may reciprocate within the piston bores 48 to produce a pumping action as the swashplate 52 is rotated. The driveshaft assembly 30 may be connected to the swashplate and driven by power source 12. The swashplate 52 of the first hydraulic pump 22 may be tilted relative to a longitudinal axis of the driveshaft assembly 30 to vary a displacement of pistons 50 relative to bores 48.

When driveshaft assembly 30 is rotated by power source 12, the angled driving surface 52a of the swashplate 52 may drive each piston 50 through a reciprocating motion within each bore 48. When the piston 50 is retracting from the bore 48, fluid may be allowed to enter the bore 48. When the piston 50 is moving into the associated bore 48 under the force of the driving surface 52a, the piston 50 may force the fluid from the bore 48 toward the first motor 26, as will be described below with reference to FIG. 3. A check valve (not shown) or other similar device, may be positioned to control the pressure at which fluid is released from the bore 48 to the first motor 26.

Second hydraulic pump 24 may be substantially similar to first hydraulic pump 22 and be connected to driveshaft assembly 30 in axial alignment with the first hydraulic pump 22. This axial alignment may allow both first hydraulic pump 22 and second hydraulic pump 24 to receive a single torque input from power source 12 via driveshaft assembly 30.

First motor 26 may be a fixed or variable displacement, bent-axis type motor fluidly coupled to housing 20. First motor 26 may include a driving rotational axis 261 (output) and a driven rotational axis 262 (input) angled relative to the driving rotational axis 261 by an angle of, for example, $\theta_1$. As described above, first motor 26 may receive pressurized fluid from first hydraulic pump 22 causing first motor 26 to rotate.

First motor 26 may convert the pressurized fluid from first hydraulic pump 22 into rotational output of a first output shaft 27, which may include an internal spline. First motor 26 may be in fluid communication with the first hydraulic pump 22 to receive high pressure fluid from and return low pressure fluid to the first hydraulic pump 22. The first motor may include multiple piston bores 88, and pistons 90 held against a fixed swashplate 92 (also known as a cradle). One piston 90 may be slidably disposed within each of the bores 88. The swashplate 92 may have a driven surface 92a, and each piston 90 may be biased into engagement with the driven surface 92a. A joint 96, such as, for example, a ball and socket joint, may be disposed between each piston 90 and swashplate 92 to allow for relative movement between the swashplate 92 and each piston 90.

Pressurized fluid may be allowed to enter piston bores 88. The pressurized fluid within piston bores 88 may act on pistons 90 to force the pistons 90 to move toward the angled driven surface 92a, thereby converting the linear motion of the pressurized fluid into a torque output of shaft 27. The angle of swashplate 52 may determine the effective displacement of pistons 90 relative to bores 88.

Figure 4:
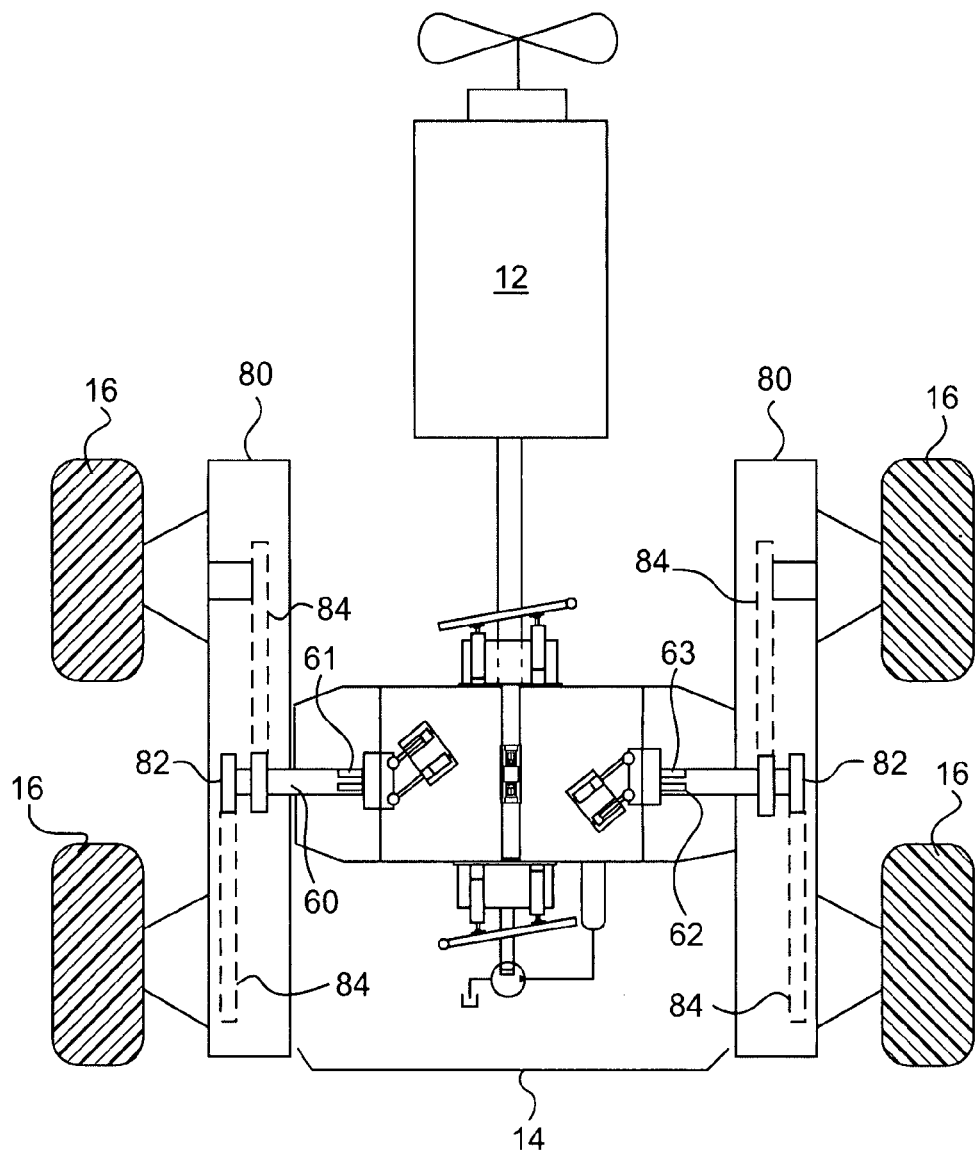
FIG. 4 is a diagrammatic and schematic illustration of an exemplary disclosed power system for use with the machine of FIG. 1.

Output shaft 27 may include a bore 271 having axially aligned ridges 272 to mesh with and transmit the rotational output to a first drive axle 60 (referring to FIG. 4). First drive axle 60 may be slidably disposed within first output shaft 27 and include axial aligned ridges 61 to engage first output shaft 27 and receive rotational output from first motor 26.

Second motor 28 may be substantially similar to first motor 26, but fluidly coupled to second hydraulic pump 24, as will be described below, with reference to FIG. 3. Second motor 28 may include a driving rotational axis 281 (output) and a driven rotational axis 282 (input) angled relative to the driving rotational axis 281 by an angle of, for example, $\theta_2$. Second motor 28 may receive pressurized fluid from second hydraulic pump 24 and convert the pressurized fluid into rotational output along a second output shaft 29 in a substantially similar manner as first motor 26. Second output shaft 29 may include a bore 291 having axially aligned ridges 292 to mesh with and transmit the rotational output to a second drive axle 62 (referring to FIG. 4). Second drive axle 62 may be slidably disposed within second output shaft 29 and include axial aligned ridges 63 to engage second output shaft 29 and receive rotational output from second motor 28.

Driveshaft assembly 30 may, in one embodiment, include a first shaft 31 associated with first hydraulic pump 22, and a second shaft 33 associated with second hydraulic pump 24. In this embodiment, first shaft 31 of first hydraulic pump 22 and second shaft 33 of second hydraulic pump 24 may each extend substantially halfway through the distance between first and second hydraulic pumps 22, 24. First shaft 31 and second shaft 33 may be coupled end-to-end by way of a coupling means 35. In an alternative embodiment, drive shaft assembly 30 may include a single integral shaft extending through both of pumps 22, 24.

Driveshaft assembly 30 may extend completely through both of the first and second hydraulic pumps 22, 24 to further drive an auxiliary pump 25. Auxiliary pump 25 may be a fixed displacement gear pump and may be mounted to second hydraulic pump 24 and driven to supply makeup fluid to first and second hydraulic pumps 22, 24, as will be described below, with reference to FIG. 3. Alternatively, it is contemplated that auxiliary pump 25 may be a variable displacement piston-type pump. Auxiliary pump 25 may communicate makeup fluid to the first and second hydraulic pumps 22, 24 through a filter 70. Filter 70 may remove contaminants from the fluid being supplied to first and second hydraulic pumps 22, 24.

A housing 20 may mechanically and fluidly support each of pumps 22, 24 and motors 26, 28. Housing 20 may include a common center section 32 to enable fluid connections between first hydraulic pump 22, second hydraulic pump 24, first motor 26, second motor 28, and any other component of transmission 14 requiring fluid connection. Housing 20, by completing the fluid connections needed to operate transmission 14, may significantly reduce the need for hoses and fittings, thereby greatly reducing the opportunity for contamination or leaks. Further, housing 20 may reduce assembly time required for transmission 14 by reducing or eliminating the need to individually connect and fit each fluid port of transmission 14. Housing 20 may also form a dry sump (not shown) to collect excess fluid. Filter 70 may be mounted to housing 20.

Figure 3:
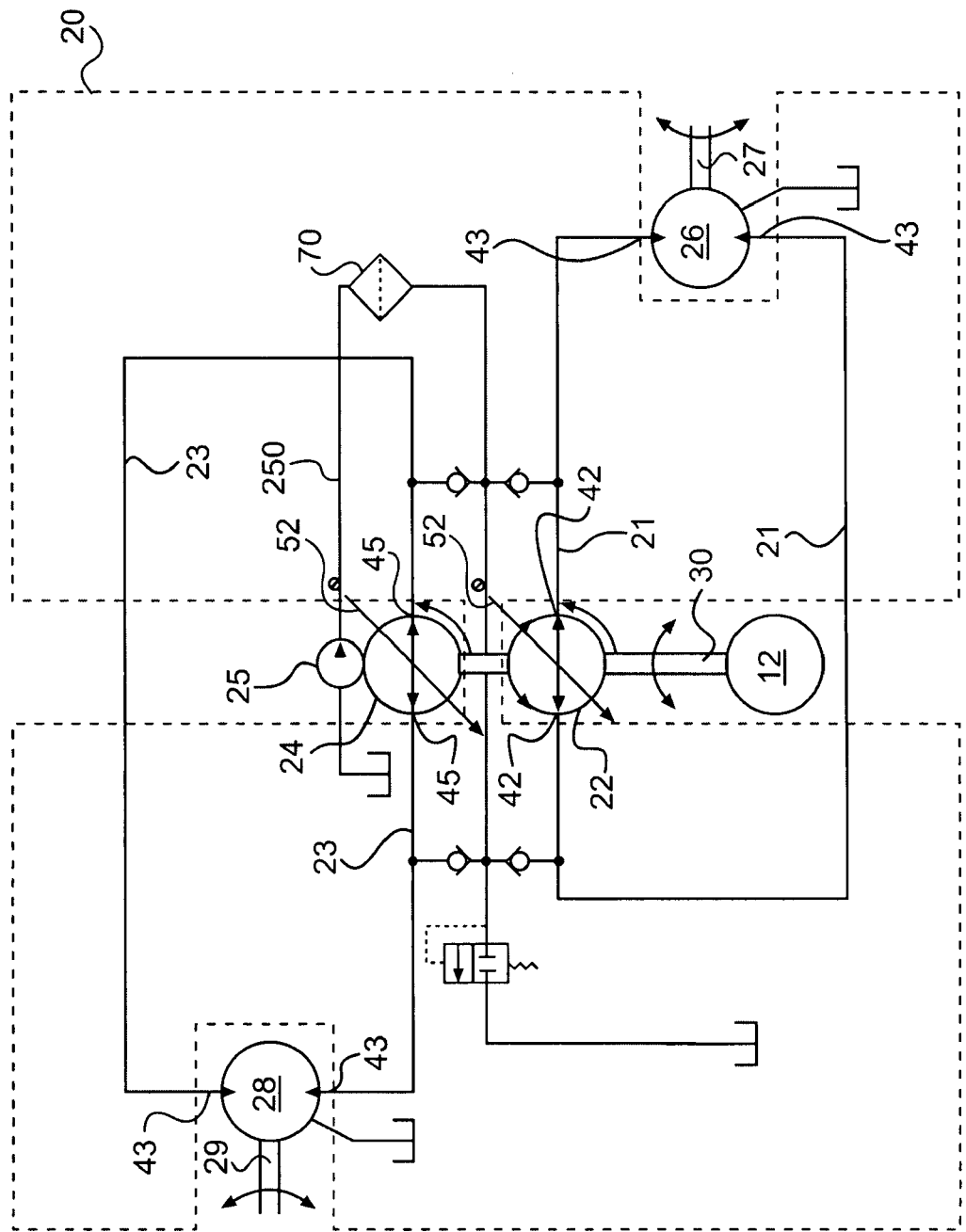
FIG. 3 is a schematic illustration of the transmission of FIG. 2.

Referring to FIG. 3, housing 20 may include a first set of internal fluid channels 21 and a second set of internal fluid channels 23. First set of channels 21 may fluidly connect one or more pump ports 42 of first hydraulic pump 22 with one or more motor ports 43 of first motor 26. Second set of channels 23 may fluidly connect one or more pump ports 45 of second hydraulic pump 24 with one or more motor ports 43 of second motor 26. Auxiliary pump 25 may supply makeup fluid to first and second pumps 22, 24 through a fluid channel 250. Fluid supplied by auxiliary pump 25 via fluid channel 250 may first pass through filter 70 to remove any contaminants from the fluid.

Referring to FIG. 4, transmission 14 may drive traction devices 16 by way of one or more chainboxes 80. Each chainbox 80 may be joined with one of first motor 26 and second motor 28 by a sprocket 82. Further, it is also contemplated that each chainbox 80 may be bolted or mechanically secured to either first motor 26 or second motor 28 in any other way known in the art. Sprocket 82 may connect to first motor 26 or to second motor 28 by way of drive axles 60, 62. That is, sprocket 82 together with drive axle 60 or 62 may be inserted from an outer surface of chainbox 80, through chainbox 80, to engage either first output shaft 27 or second output shaft 29.

INDUSTRIAL APPLICABILITY

The disclosed transmission may provide a flexible and robust way to combine two hydraulic pumps and two hydraulic motors into one assembly, while minimizing volume and hardware. Further, the disclosed drivetrain may benefit from its ease of assembly, reduction of leak points, and ease of maintenance. The operation of transmission 14 will now be described.

Referring to FIG. 1, when machine 10 is in operation, power source 12 may combust a fuel/air mixture to produce mechanical output, which may be used to directly rotate driveshaft assembly 30 (referring to FIG. 2). As driveshaft assembly 30 turns, its rotational energy may be used to directly drive first hydraulic pump 22, second hydraulic pump 24, and auxiliary pump 25. Each of pumps 22, 24, and 25 may translate the rotational movement of driveshaft 30 to a fluid pressurizing motion. First and second hydraulic pumps 22, 24 may provide pressurized fluid to first and second motors 26, 28, respectively. Auxiliary pump 25 may provide pressurized makeup fluid to first and second hydraulic pumps 22, 24 through filter 70 to maintain constant fluid connection throughout transmission 14.

First motor 26 and second motor 28 may receive pressurized fluid via channels 21 and 23, respectively, and convert the pressurized fluid to rotational motion. The pressurized fluid may be used to drive pistons 90 that act against swashplate 92 and, in turn, rotate first and second output shafts 27, 29.

As first and second output shafts 27, 29 rotate, they may engage first and second drive axles 60, 62, which may be rotably disposed therein. Since each of the first and second drive axles 60, 62 may either be coupled to, or a component of, a sprocket 82 (referring to FIG. 4), the rotational movement of first and second drive axles 60, 62 may correspond to a substantially similar movement of each sprocket 82. As each sprocket 82 rotates about its axis, each sprocket 82 may engage and transmit torque to at least one traction device 16 to drive machine 12.

Because the transmission 14 may be directly driven by a single drive shaft 30, and the motors may be bent-axis motors, the volume of transmission 14 may be less than that of a similar transmission utilizing gear trains. Further, the efficiency of the disclosed transmission 14 may be greater than similar transmissions using gear trains, since mechanical losses that may occur in a gear train (i.e., friction) are reduced. Further, the hydraulic pumps and bent-axis motors, being connected to a common housing, may increase the efficiency and ease of assembly since the pumps and motors may be mechanically connected to a common housing with internal fluid channels to reduce the need for additional hardware, such as hoses.

It will be apparent to those skilled in the art that various modifications and variations can be made to the drivetrain of the present disclosure. Other embodiments of the drivetrain will be apparent to those skilled in the art from consideration of the specification and practice of the transmission disclosed herein. It is intended that the specification and examples be considered as exemplary only, with a true scope of the disclosure being indicated by the following claims and their equivalents.

What is claimed is:

1. A drivetrain, comprising:
   a housing;
   a first hydraulic pump connected to the housing;
   a second hydraulic pump connected to the housing in axial alignment with the first hydraulic pump;
   a first motor fluidly connected to the first hydraulic pump and having an axial direction substantially perpendicular to the axial alignment of the first and second hydraulic pumps; and
   a second motor fluidly connected to the second hydraulic pump and having an axial direction substantially perpendicular to the axial alignment of the first and second hydraulic pumps,
   wherein the housing completes a first fluid connection between the first hydraulic pump and the first motor.

2. The drivetrain of claim 1, wherein the first and second motors are axially aligned.

3. The drivetrain of claim 1, wherein:
   the first motor includes a first internal spline to receive a first drive axle; and
   the second motor includes a second internal spline to receive a second drive axle.

4. The drivetrain of claim 1, wherein the first and second motors are bent-axis motors.

5. The drivetrain of claim 1, further including a driveshaft assembly extending completely through at least one of the first and second hydraulic pumps to receive a torque input.

6. The drivetrain of claim 5, wherein:
   the driveshaft assembly includes:
      a first shaft associated with the first hydraulic pump; and
      a second shaft associated with the second hydraulic pump; and
   the first and second shafts are joined end-to-end within the housing.

7. The drivetrain of claim 5, wherein the driveshaft assembly extends completely through both of the first and second hydraulic pumps, and the drivetrain further includes an auxiliary pump connected to one of the first and second hydraulic pumps and driven by the driveshaft assembly.

8. The drivetrain of claim 7, wherein the auxiliary pump is connected to supply makeup fluid to the first and second hydraulic pumps.

9. The drivetrain of claim 8, further including a filter mounted to the housing and fluidly connected between the auxiliary pump and the first and second pumps.

10. The drivetrain of claim 1, wherein the housing forms a dry sump.

11. The drivetrain of claim 1, wherein the housing completes a second fluid connection between the second hydraulic pump and the second motor.

12. A drivetrain, comprising:
    a housing;
    a single integral shaft extending through two opposing sides of the housing;
    a first hydraulic pump connected to the housing and directly driven by the single integral shaft;
    a second hydraulic pump connected to the housing and directly driven by the single integral shaft;
    a first motor connected to the housing and driven by the first hydraulic pump; and
    a second motor connected to the housing and driven by the second hydraulic pump,
    wherein the housing completes a first fluid connection between the first hydraulic pump and the first motor.

13. The drivetrain of claim 12, wherein each of the first and second motors include internal splines to receive a first and a second drive axle.

14. The drivetrain of claim 12, wherein the first and second motors are bent-axis motors.

15. The drivetrain of claim. 12, wherein the driveshaft extends completely through at least one of the first and second hydraulic pumps to receive a torque input.

16. The drivetrain of claim 15, wherein the driveshaft extends completely through both of the first and second hydraulic pumps, and the drivetrain further includes an auxiliary pump connected to one of the first and second hydraulic pumps and driven by the driveshaft.

17. The drivetrain of claim 16, wherein the auxiliary pump is configured to supply makeup fluid to the first and second hydraulic pumps.

18. The drivetrain of claim 12, wherein the housing forms a dry sump.

19. A machine, comprising:
    an engine configured to produce a torque output;
    a driveshaft directly driven by the engine;
    a first hydraulic pump configured to axially receive the driveshaft;
    a second hydraulic pump connected to axially receive the driveshaft;
    a third hydraulic pump connected to the second hydraulic pump and configured to axially receive the driveshaft;
    a common dry sump housing connected to the first and second hydraulic pump;
    a first motor connected to the common dry sump housing, fluidly driven by the first hydraulic pump, and having an axial direction substantially perpendicular to the driveshaft;
    a second motor connected to the common dry sump housing, fluidly driven by the second hydraulic pump, and having an axial direction substantially perpendicular to the driveshaft; and
    a filter mounted to the common dry sump housing and fluidly connected between the third hydraulic pump and the first and second hydraulic pumps,
    wherein the housing completes a first fluid connection between the first hydraulic pump and the first motor.

20. The machine of claim 19, wherein the first and second motors are bent-axis motors having internal splines to receive axially aligned drive axles.

* * * * *